Patented Jan. 17, 1939

2,144,383

UNITED STATES PATENT OFFICE 2,144,383

METHOD OF MOISTUREPROOFING

Frederick M. Meigs, Niagara Falls, N. Y., assignor to E. I. du Pont de Nemours & Company, Wilmington, Del., a corporation of Delaware No Drawing. Application June 23, 1937, Serial No. 149,915

14 Claims. (Cl. 18—57)

This invention relates to modified cellulosic pellicles which, when unmodified, are water sensitive and obtainable by coagulation and/or regeneration from an aqueous solution (sometimes called a dispersion) of a cellulosic material. More particularly, it relates to such pellicles containing a moistureproofing agent, particularly a wax or wax-like material, and which is both transparent and moistureproof. Still more particularly, it relates to the process of making such pellicles.

It is known that various materials can be incorporated in an aqueous solution of a cellulosic material and that pellicles or filaments can be coagulated and/or regenerated from such compositions. However, these compositions when formed into films in the ordinary fashion do not yield transparent or moistureproof materials. It is also known to make non-fibrous moistureproof sheets and films by applying an appropriate coating to a nonmoistureproof base, as exemplified in U. S. patent to Charch and Prindle No. 1,737,187.

It is an object of this invention to provide an improved method for forming moistureproof pellicles from aqueous solutions of cellulosic substances. A further object is to provide cellulosic pellicles containing a moistureproofing agent, said pellicles being both transparent and moistureproof. A still further object is to provide transparent moistureproof wax-containing pellicles of regenerated cellulose. Other objects will become apparent from the following description of the invention.

These objects are accomplished, in general, by forming a dispersion of a moistureproofing agent, particularly a wax, in an aqueous solution of a cellulosic material, coagulating and/or regenerating the dispersion in the form of a film or pellicle, treating the thus formed pellicle with a solution of a blending agent for the moistureproofing agent, and drying the pellicle. In one form of the invention, the dried pellicles are subsequently subjected, if necessary, to pressure, preferably at an elevated temperature, in order to render them transparent.

For the purposes of this invention, moistureproof materials are defined as those which, in the form of thin continuous unbroken sheets or films, will permit the passage of not more than 690 grams of water vapor per 100 square meters per hour over a period of 24 hours at approximately 39.5° C.±0.5° C., the relative humidity of the atmosphere at one side of the film being maintained at least at 98% and the relative humidity of the atmosphere at the other side being maintained at such value as to give a humidity differential of at least 95%.

For the purpose of experimental tests, moistureproof sheets and films include those which in a thickness of approximately 0.0009 inch will produce a sheet which will permit the passage therethrough of not more than 690 grams of water vapor per 100 square meters per hour over a period of approximately 24 hours at a temperature of 39.5° C.±0.5° C. with a water vapor pressure differential of 50 to 55 millimeters (preferably 53.4±0.7 millimeter) of mercury. For convenience, the number of grams of water vapor passed under these conditions may be referred to as the "permeability value". An unmodified sheet of regenerated cellulose having a thickness of approximately 0.0009 inch will show a permeability value of the order of 6,900.

From the foregoing, it is apparent that, under the conditions set forth, a moistureproof regenerated cellulose sheet is capable of resisting the passage of moisture or water vapor therethrough at least ten times as effectively as the unmodified sheet.

As the aqueous solution of a cellulosic material, viscose is preferred. There also may be used, however, other aqueous alkaline solutions of cellulosic materials, such as lowly etherified and lowly esterified cellulose derivatives, including lowly etherified methyl cellulose, lowly etherified ethyl cellulose, lowly etherified glycol cellulose, lowly esterified cellulose acetate, etc. There also may be used acid soluble cellulosic materials, such as amino cellulose and the like. These materials are in the general class of cellulosic materials, which, when unmodified, are water sensitive. They can be coagulated and/or regenerated by means of heat, aqueous solutions of acids, alkalis or salts, or the like.

As the moistureproofing agent, it has been found preferable to use a wax or wax-like substance and particularly one of rather high melting point. Paraffin waxes of higher or lower melting point may be used depending upon the degree of moistureproofness and/or the surface characteristics desired. Other waxes such as ozocerite, beeswax, carnauba wax, Chinese insect wax and synthetic waxes and wax-like materials may be used. Other materials such as those described and claimed in the patents to Charch, Brubaker and Meigs, No. 2,098,534 to No. 2,098,542, inclusive, may be employed. These moistureproofing agents, of course, are not soluble in water and must be dispersed in the aqueous cellulosic solution. In doing this, in order to secure good moistureproofness and transparency, care must be taken to see that the size of the wax particles is kept small. It has been found, for example, that the average size of the wax particles should be below 4 microns in diameter and preferably between 0.5 and 2 microns in diameter or even less in size. This particle size may be achieved in any desired fashion such as by grinding the dispersion in a colloid mill.

The dispersion is formed in any desired fashion, such as by adding a dispersing medium to the cellulosic solution and dispersing the moistureproofing agent directly therein, such as by the aid of a colloid mill. It is preferred, however, to form a dispersion of the moistureproofing agent in an aqueous dispersing medium, such as by the aid of a colloid mill, and then mix the thus formed dispersion with the aqueous cellulosic solution. The dispersion is then ready for casting. Since the preferred form of this invention contemplates the employment of an alkaline cellulosic solution, it is preferred to have the dispersing medium for the wax an alkaline solution such as an ammoniacal solution of casein. In general, the dispersion can be any which is compatible with the solution of cellulosic material used and does not have any deleterious effect on the same, such as coagulation or regeneration.

The moistureproofing agent content of the dispersion may be any at which a satisfactory dispersion can be prepared but is preferably greater than 3%. In addition to the moistureproofing agent, such as wax, there may be used other materials such as other moistureproofing agents, paraffin oils, vegetable oils, and blending agents. Blending agents, particularly if alkali soluble, may be incorporated either in the wax emulsion or in the cellulosic solution. Examples of such materials are dodecyl acid phthalate, cocoanut oil acids, oleic acid, stearic acid, sodium dodecyl sulfate and others. The amount of moistureproofing agent dispersed in the cellulosic solution may be any convenient quantity from a trace to 15% or more of the weight of the cellulosic material and conveniently is such as to produce a film having from 0.5 to 12%, and especially 3 to 7% moistureproofing agent based on the weight of cellulose or cellulose derivative in the film. When a moistureproofing agent, particularly a wax, is used in combination with other materials, the amount of solids added to the cellulosic solution may be as high as 30 to 40% of the cellulose content of the solution.

The cellulosic solution is cast into the form of a pellicle in any manner well known in the art. In the case of viscose, for example, it is customary to extrude the solution into an aqueous bath comprising sodium sulfate and sulfuric acid. The coagulated and/or regenerated pellicle is then lead, if desired, through suitable treating baths such as washing, desulfuring, bleaching, softening, etc. Before, during, or after certain of these treatments, but preferably at the same time as impregnation with a softener and just prior to drying, the pellicle is lead through a suitable solution of one or more blending agents for the moistureproofing agent and cellulosic film base. By the term "blending agent" is meant a material which is compatible with, or has a high degree of tolerance for, or solvent action on moistureproofing agents. If necessary, prior to impregnation with the blending agent, the film may be subjected to a treatment enabling the blending agent to properly attach itself to the film and mingle with the moistureproofing agent therein.

Suitable blending agents are those which are insoluble in water but soluble in certain aqueous solutions such as dilute bases or dilute acids. They may then be employed in the appropriate aqueous solution and the gel or water wet film impregnated therewith by merely passing through the solution without any other treatment. The acids or bases employed to effect the solution may be any one of a large number of water soluble inorganic or organic acids or bases. Suitable acids are acetic, formic, citric, glycollic, malic, maleic, succinic, adipic, phthalic, tartaric, benzoic and hydrochloric acids, and the like. Suitable bases are ammonium hydroxide, sodium hydroxide, methylamine, ethanolamine, and the like. In the case of salts formed by reacting with volatile acids or bases, particularly volatile acids and bases which are only slightly ionized, like acetic acid or ammonium hydroxide, said salts are easily and quickly made insoluble in water and organic solvents merely by drying, particularly at elevated temperatures, since the acids or bases, being only slightly ionized, are readily disassociated from their salts and, being volatile, are easily removed by heat, leaving insoluble residues. Salts formed from the non-volatile and/or highly ionized acids and bases are much less readily converted to insolubility and consequently, in the practice of this invention, it is preferred to use salts with volatile acids and bases of low ionization such as acetic acid or ammonium hydroxide. In some cases, salts of non-volatile acids may be converted into the insoluble form by treatment with ammonia as, for example, in the form of gaseous ammonia.

The blending agents employed may be either resinous or non-resinous. Suitable resinous alkali soluble blending agents are rosin, hydrogenated rosin, and modified rosin, as described and claimed in U. S. patent to Morton, No. 2,017,866. Non-resinous alkali soluble blending agents which can be used are dodecyl acid phthalate, the monododecyl ester of the dibasic acid prepared by the condensation of terpinene with maleic anhydride, oleic acid, dodecyl sulfonate, alkyd type resins modified with long-chain aliphatic acids, such as stearic acid or drying oil acids, or the like. Examples of both resinous and non-resinous blending agents which are soluble in dilute acid are the N-dimethylaminomethyl derivative of abietamide, dicyclohexylaminoethanol, dicyclohexylaminoethyl alpha-methacrylate monomer or polymer, the N-dimethylaminomethyl derivative of stearamide, 9:10-octodecenyl amine, the condensation product of p-hydroxydiphenyl with dimethylamine and formaldehyde, and similar materials. Particularly suitable as resinous blending agents are amino polymers (where the amino nitrogen may be primary, secondary or tertiary, or part of an open chain or cyclic molecular structure) insoluble in water and in 5% aqueous ammonia but soluble in 2% aqueous acetic acid, such as dicyclohexylaminoethyl alpha-metacrylate and the condensation product of p-hydroxydiphenyl with dimethylamine and formaldehyde.

In many cases it has been found that better moistureproofness and transparency can be secured by the use of water insoluble blending agents whether resinous or non-resinous. These ordinarily cannot be applied to the film while in the gel or water wet stage. In order to overcome this difficulty, the film is preferably subjected, prior to impregnation, to a dehydration step. This is conveniently accomplished by passing the gel or water wet film through an organic water miscible solvent in which the blending agent is soluble, particularly 95% alcohol or acetone. The film is then treated as before with an alcoholic or other organic solvent solution of the blending agent. Examples of blending agents which can be used in this species of the invention are gum damar, gum elemi, ester gum, hydrogenated ester gum, halogenated diphenyls, alkyd type resins, vinyl resins, natural balsam or synthetic balsam-like materials such as diethylene glycol hydrorosinate, methyl abietate, the diricinoleic ester of glycerol, lanolin, hydrogenated oils, hydrogenated castor oil phthalate, retene, bis-dodecyl phthalate, butyl stearate, resins prepared by polymerization of 1,4-dihydronaphthalene, resins prepared by condensation of naphthone with formaldehyde, and others.

The aqueous acidic or aqueous basic or organic solvent solution containing the blending agent preferably also contains one or more softeners for the cellulosic base, said softener, of course, being soluble in the solvent for the blending agent. Examples of such softeners are glycerol, glycol, urea, diethylene glycol, propylene glycol, butoxyethoxyethyl carbamate, bis-methoxyethyl abietate, and the like.

Many of the above mentioned blending agents and particularly the resinous ones may have some film-forming properties. Whether or not they have film-forming action, in many cases it is desired to add one or more film-formers to the impregnating solution. This film-former may be any one of those blending agents mentioned above which have film-forming properties, depending upon the degree of film-forming action desired and the blending agents used. The number of film-formers available is considerable. It is appreciated, of course, that some of the film-formers mentioned in the following list may have blending action and preferably should be compatible with the blending agent used. In some cases, they are soluble in aqueous acid solution or aqueous alkaline solution and, in other cases, in organic solvents. The materials used, of course, must be soluble or dispersible in the solution in which they are incorporated. Examples of suitable materials are cellulose derivatives, such as cellulose nitrate, cellulose acetate, ethyl cellulose, benzyl cellulose, mixed esters or ether esters of cellulose, etc.; natural or semi-synthetic resins, such as rosin, hydrogenated rosin, and their derivatives, including glycerol, glycol, or diethylene glycol esters of rosin or hydrogenated rosin, gum damar; synthetic resins, such as alkyd type resins, either modified or unmodified, metastyrene resin, phenolic condensation products; vinyl resins, such as vinyl acetate, polymerized chlorvinyl acetate and polymerized vinyl acetal resins; rubber, gutta percha, balata, caoutchouc, synthetic rubbers including polymers of isoprene, butadiene, and their homologues; chemical derivatives of rubber, such as halogenated rubber, rubber treated with sulfuric acid, rubber treated with tintetrachloride, rubber treated with chlorostannic acid, rubber hydrochloride; polymerized esters of alpha methacrylic acid such as methyl methacrylate; amino polymers (where the amino nitrogen may be primary, secondary or tertiary, part of an open chain or of a cyclic molecular structure) insoluble in water and in 5% aqueous ammonia but soluble in 2% aqueous acetic acid, such as dicyclohexylaminoethyl alpha-methacrylate, diethylaminoethyl alpha-methacrylate, interpolymer of dicyclohexylaminoethyl alpha-methacrylate with dimethylaminoethyl alpha-methacrylate or methylvinyl ketone, the resin prepared by condensation of di-N-butylamine with polyvinyl chloroacetate or the like; varnishes, etc.

It may also be desirable in some cases to include in the impregnating solution plasticizers for the film-former and/or blending agent. They may be soluble in the solution containing the blending agent and/or film-former or they may be dispersed in said solution depending upon the particular solubility of the plasticizer used. Examples of both types are diamyl phthalate, tricresyl phosphate, dicyclohexyl phthalate, butyl benzoylbenzoate, dodecyl benzoylbenzoate, dodecyl acid phthalate, the octyl ester of C-dimethylglycine, the N-dimethylaminomethyl derivative of octyl carbamate or the like. Mixtures of plasticizers may, if desired, be used.

In the case where blending agents and other ingredients are applied from aqueous acid or basic solutions, it may be desired to add a wetting agent to the impregnating solution in order to improve the wetting of the gel or water wet cellulosic pellicles by the impregnating solution. In the case of acid solutions, the wetting agents which may be used are long-chain primary aliphatic amines such as octadecylamine, octadecenylamine, dodecylamine, heptadecylamine and others. In the case of basic solutions of blending agents and other ingredients, there may be used such substances as stearic acid, oleic acid, dodecyl sulfonate, and others.

The proportions of the ingredients in the impregnating solution may vary within wide limits and depend to a large extent upon the solubility of the ingredient and the amount desired to be contained in the final sheeting. Preferably, the blending agent comprises 1 to 14% and more particularly, 3 to 9% of the impregnating solution. The concentration of film-former may be 0 to 8% and preferably from 3 to 6%. The concentration of softener is preferably 2 to 8% and particularly 3 to 6%. The quantity of plasticizer and wetting agent, if necessary to be employed, depends largely upon the other ingredients in the composition and the qualities desired in the final sheeting.

After impregnation with a blending agent, softeners, and other ingredients, the film is then dried such as by passing over heated rollers in the usual manner. In order to secure good moistureproofness, it is necessary to heat the film, after impregnation with the blending agent, to a point above the melting point of the moistureproofing agent employed. This is easily effected by drying at a suitable temperature. Even this treatment, however, does not in all cases secure transparency. Where it is not so achieved by the ordinary process of drying, it may be secured by subjecting the film to high pressure, preferably at an elevated temperature for a suitable period of time. The pressure necessary is at least 100 pounds per square inch and preferably very much higher than this, such as in excess of 1,000 pounds per square inch. The temperature employed should be at least equal to the melting point of the moistureproofing agent used and preferably between 60 and 90° C., or higher. The period of time required to secure transparency varies with the temperature and pressure employed. With a pressure of 3,000 pounds per square inch and a temperature of 70 to 75° C., for example 10 to 20 minutes is required. Pressure is preferably applied by means of highly polished plates between which the film is placed or by means of calender rollers. Besides securing transparency, this treatment in many cases somewhat improves the moistureproofness.

Having described the invention generally, the following specific examples are now given although these are to be considered as illustrative and not limitative.

EXAMPLE I

A dispersion is prepared as follows: 7.5 parts of casein are stirred for some time in 100 parts of hot water and finally dissolved by addition of 7 parts of concentrated ammonium hydroxide with further stirring. 110 parts of water is then added. Finally, 35 parts of molten paraffin wax (melting point 62–64° C.) at a temperature of approximately 80° C. is added to the aqueous solution of casein and the resulting mixture circulated for a short time in a colloid mill at a temperature of 80 to 90° C. 5 parts of the thus formed emulsion are then added to 200 parts of viscose containing 6.5% sodium hydroxide and 7% cellulose. After de-aeration of this viscose, it is regenerated in pellicular form, purified, and is ready for treatment in accordance with subsequent examples.

EXAMPLE II

*Aqueous phase*

| | Parts |
|---|---|
| Casein | 4.1 |
| Trisodium phosphate monohydrate | 0.9 |
| Isopropyl naphthalene sodium sulfonate | 0.4 |
| Concentrated ammonium hydroxide | 3.0 |
| Water | 215.0 |

*Disperse phase*

| | Parts |
|---|---|
| Paraffin wax (melting point 62–64° C.) | 11.7 |
| Diethylene glycol hydrorosinate | 23.3 |

The disperse phase is added with stirring to the aqueous phase at a temperature of approximately 80° C. and circulated through a colloid mill at a temperature of 80 to 90° C. 12 parts of this emulsion are added to 200 parts of viscose as in Example I. The viscose is regenerated in pellicular form and, after purification, is ready for treatment as in subsequent examples.

EXAMPLE III

To 240 parts of the viscose-wax dispersion mixture of Example I is added 2 parts of dodecyl acid phthalate with stirring. The viscose thus obtained is regenerated in pellicular form and purified after which the pellicles are ready for treatment as in subsequent examples.

EXAMPLE IV

*Aqueous phase*

| | Parts |
|---|---|
| Casein | 35 |
| Concentrated ammonium hydroxide | 26 |
| Water | 880 |

*Disperse phase*

| | Parts |
|---|---|
| Paraffin wax (melting point 62–64° C.) | 35 |
| Methyl ester of hydrogenated abietic acid | 35 |

The aqueous phase is prepared as in Example I and the disperse phase added thereto at a temperature of approximately 80° C. and circulated through a colloid mill at a temperature of 80 to 90° C. until the requisite degree of dispersion is obtained. 8 parts of this dispersion is then added to 100 parts of viscose containing 6.5% sodium hydroxide and 7% cellulose. In this mixture is stirred 0.4 parts of dodecyl acid phthalate. The viscose is cast in the form of pellicles and purified in the usual manner, after which it is ready for treatment as in subsequent examples.

EXAMPLE V

Gel pellicles prepared as in Example I, II, III, or IV, are impregnated with a 4% aqueous solution of glycerol or butoxy-ethoxyethyl carbamate. After drying on rolls in the usual manner, the pellicles are neither transparent nor moistureproof. The pellicles are then pressed between highly polished plates at a temperature of 80° C. and a pressure of 3,000 pounds per square inch for a period of 15 to 20 minutes. The pellicles are transparent but not moistureproof. This example is illustrative of the fact that moistureproofness cannot be obtained without the use of a blending agent.

EXAMPLE VI

Gel pellicles prepared as in Examples I, II, III, or IV are passed through a solution containing 4% butoxyethoxyethyl carbamate, 2.7% hydrogenated rosin and 5% alcohol in dilute ammonium hydroxide. The excess is removed by a squeeze roll and the pellicles dried in the usual manner. The dry sheet is not transparent but is moistureproof. It can be rendered both transparent and moistureproof by the heat and pressure treatment as in Example V.

EXAMPLE VII

Pellicles prepared from viscose containing 4 parts of the dispersion as in Example I to 200 parts of viscose are impregnated in the gel state with a solution of 1.5% monododecyl ester of the dibasic acid obtained by the condensation of terpinene and maleic anhydride and 1.5% of hydrogenated abietic acid in dilute ammonium hydroxide. The pellicles are dried in the usual manner and supercalendered at a temperature of 90° to 100° C. The resulting pellicles are both moistureproof and transparent.

EXAMPLE VIII

Gel pellicles prepared as in Example I are dehydrated by passage through one or more baths of 95% alcohol. They are then impregnated with a 5% solution in alcohol of the hydrogenated abietic acid ester of diethylene glycol and dried in the usual manner. Finally, they are treated between highly polished plates at 3,000 pounds per square inch pressure at 70 to 80° C. for 10 to 15 minutes. The pellicles are transparent and moistureproof.

EXAMPLE IX

Gel pellicles prepared as in Example I are dehydrated by passage through one or more baths containing 95% alcohol and are then impregnated with a solution of 4% hydrogenated rosin and 4% butoxyethoxyethyl carbamate dissolved in alcohol. The pellicles are dried in the usual manner. They are treated between highly polished plates at a pressure of 3,000 pounds per square inch at a temperature of 70 to 80° C. for a period of 10 to 15 minutes. The pellicles are transparent and moistureproof.

EXAMPLE X

Viscose containing 4.5 parts of the dispersion of Example I to 200 parts of viscose is cast into pellicular form and, after purification, is impregnated with a solution in 12% aqueous acetic acid of 4% butoxyethoxyethyl carbamate, 4% dicyclohexylaminoethyl alpha-methacrylate polymer and 8% dicyclohexylaminoethyl alpha-methacrylate monomer. Excess of the impregnating solution is removed from the surface of the pellicle by means of doctor knives adjusted to give a coating when dry having a total combined thickness of not more than 0.0005 inch. The pellicle thus treated is dried on frames or by other suitable means for 30 minutes at a temperature of 70 to 110° C. Alternatively, it may be dried by exposure to the air at room temperature for 30 minutes and then heated for 30 minutes in a vacuum at 100° C. The pellicle thus treated is both transparent and moistureproof.

EXAMPLE XI

Pellicles prepared from viscose as in Example X are impregnated with a solution in 8% aqueous acetic acid containing 5% butoxyethoxyethyl carbamate, 8% dicyclohexylaminoethyl alpha-methacrylate monomer, 4% dicyclohexylaminoethyl alpha-methacrylate polymer, and 0.1% heptadecyl amine. The excess of the impregnating solution is removed as in Example X and the pellicles dried at room temperature, or at a temperature of 105° C. for a period of 10 to 20 minutes.

The process of the present invention eliminates a separate coating operation and accomplishes the preparation of moistureproof pellicles at the same time as the pellicles are laid down. This is important from the standpoint of cost. The pellicles show permeability values of 600, 400, 300, 100 or even less. They possess unique burning properties, and tend to burn more evenly and more completely than wax-free pellicles, even though they are not more inflammable than wax-free pellicles. This property renders them very suitable for certain purposes such as cigarette paper, etc.

Since it is obvious that various changes and modifications may be made in the above description without departing from the nature and spirit thereof, it is to be understood that the invention is not to be limited thereto except as set forth in the appended claims.

I claim:

1. The method of forming moistureproof cellulosic pellicles comprising forming a dispersion of a moistureproofing agent in an aqueous solution of a cellulosic material, coagulating said dispersion in the form of a pellicle; impregnating said pellicle with a blending agent for said moistureproofing agent and said cellulosic material, and drying said pellicle.

2. The method of forming moistureproof cellulosic pellicles comprising forming a dispersion of a moistureproofing agent in an aqueous solution of a cellulosic material, coagulating said dispersion in the form of a pellicle, impregnating said pellicle with a blending agent for said moistureproofing agent and said cellulosic material and a softener for said cellulosic material, and drying said pellicle.

3. The method of forming moistureproof cellulosic pellicles comprising forming a dispersion of a moistureproofing agent in an aqueous solution of a cellulosic material, coagulating said dispersion in the form of a pellicle, impregnating said pellicle with an aqueous acid solution of a blending agent for said moistureproofing agent and said cellulosic material and a softener for said cellulosic material, and drying said pellicle.

4. The method of forming moistureproof cellulosic pellicles comprising forming a dispersion of a moistureproofing agent in an aqueous solution of a cellulosic material, coagulating said dispersion in the form of a pellicle, impregnating said pellicle with an aqueous alkaline solution of a blending agent for said moistureproofing agent and said cellulosic material and a softener for said cellulosic material, and drying said pellicle.

5. The method of forming moistureproof cellulosic pellicles comprising forming a dispersion of a moistureproofing agent in an aqueous solution of a cellulosic material, coagulating said dispersion in the form of a pellicle, treating said pellicle with a water miscible organic solvent to dehydrate the same, impregnating said pellicle with a solution of a blending agent for said moistureproofing agent and said cellulosic material and a softener for said cellulosic material in a further quantity of said solvent, and drying said pellicle.

6. The method of forming moistureproof regenerated cellulose pellicles comprising forming a dispersion of a moistureproofing agent in viscose, coagulating said dispersion in the form of a pellicle, impregnating said pellicle with a blending agent for said moistureproofing agent and said cellulosic material, a softener for said cellulosic material, and a film-former, and drying said pellicle at a temperature in excess of the melting point of the moistureproofing agent.

7. The method of forming moistureproof regenerated cellulose pellicles comprising forming a dispersion of a moistureproofing agent in viscose, coagulating said dispersion in the form of a pellicle, impregnating said pellicle with an aqueous acid solution of a blending agent for said moistureproofing agent and said cellulosic material, a softener for said cellulosic material, and a film-former, and drying said pellicle at a temperature in excess of the melting point of the moistureproofing agent.

8. The method of forming moistureproof regenerated cellulose pellicles comprising forming a dispersion of a moistureproofing agent in viscose, coagulating said dispersion in the form of a pellicle, impregnating said pellicle with an aqueous alkaline solution of a blending agent for said moistureproofing agent and said cellulosic material, a softener for said cellulosic material, and a film-former, and drying said pellicle at a temperature in excess of the melting point of the moistureproofing agent.

9. The method of forming moistureproof regenerated cellulose pellicles comprising forming a dispersion of a moistureproofing agent in viscose, coagulating said dispersion in the form of a pellicle, treating said pellicle with a water miscible organic solvent to dehydrate the same, impregnating said pellicle with a solution of a blending agent for said moistureproofing agent and said cellulosic material a softener for said cellulosic material, and a film-former in a further quantity of said solvent, and drying said pellicle at a temperature in excess of the melting point of the moistureproofing agent.

10. The method of forming moistureproof regenerated cellulose pellicles comprising forming a dispersion of a wax in viscose, coagulating said dispersion in the form of a pellicle, impregnating said pellicle with a dilute acetic acid solution of butoxyethoxyethyl carbamate, dicyclohexylaminoethyl alpha-methacrylate monomer and dicyclohexylaminoethyl alpha-methacrylate polymer, and drying said pellicle at a temperature in excess of the melting point of the wax.

11. The method of forming moistureproof cellulosic pellicles comprising forming a dispersion of a moistureproofing agent in an aqeuous solution of a cellulosic material, coagulating said dispersion in the form of a pellicle, impregnating said pellicle with a blending agent for said moistureproofing agent and said cellulosic material and a softener for said cellulosic material, drying said pellicle, and subjecting said pellicle to pressure.

12. The method of forming moistureproof cellulosic pellicles comprising forming a dispersion of a moistureproofing agent in an aqueous solution of a cellulosic material, coagulating said dispersion in the form of a pellicle, impregnating said pellicle with an aqueous acid solution of a blending agent for said moistureproofing agent and said cellulosic material and a softener for said cellulosic material, drying said pellicle, and subjecting said pellicle to a pressure of at least 100 pounds per square inch at a temperature in excess of the melting point of the moistureproofing agent.

13. The method of forming moistureproof cellulosic pellicles comprising forming a dispersion of a moistureproofing agent in an aqueous solution of a cellulosic material, coagulating said dispersion in the form of a pellicle, impregnating said pellicle with an aqueous alkaline solution of a blending agent for said moistureproofing agent and said cellulosic material and a softener for said cellulosic material, drying said pellicle, and subjecting said pellicle to a pressure of at least 100 pounds per square inch at a temperature in excess of the melting point of the moistureproofing agent.

14. The method of forming moistureproof cellulosic pellicles comprising forming a dispersion of a moistureproofing agent in an aqueous solution of a cellulosic material, coagulating said dispersion in the form of a pellicle, treating said pellicle with a water miscible organic solvent to dehydrate the same, impregnating said pellicle with a blending agent for said moistureproofing agent and said cellulosic material, a softener for said cellulosic material, and a film-former, in a further quantity of said solvent, drying said pellicle, and subjecting said pellicle to a pressure of at least 100 pounds per square inch at a temperature in excess of the melting point of the moistureproofing agent.

FREDERICK M. MEIGS.